United States Patent
Han et al.

(10) Patent No.: US 10,526,759 B2
(45) Date of Patent: Jan. 7, 2020

(54) ISOLATION AND RESTORATION METHOD FOR COMPOUND CONTAMINATED SOIL

(71) Applicant: MINING DEVELOPMENT AND ENVIRONMENTAL MANAGEMENT OF SHAANXI PROVINCIAL LAND ENGINEERING CONSTRUCTION GROUP CO., LTD., Xi'an (CN)

(72) Inventors: Jichang Han, Xi'an (CN); Shuguang Wang, Xi'an (CN); Pengfeng Li, Xi'an (CN)

(73) Assignee: MINING DEVELOPMENT AND ENVIRONMENTAL MANAGEMENT OF SHAANXI PROVINCIAL LAND ENGINEERING CONSTRUCTION GROUP CO., LTD., Shaanxi (CN)

( * ) Notice: Subject to any disclaimer, the term of this patent is extended or adjusted under 35 U.S.C. 154(b) by 0 days.

(21) Appl. No.: 16/191,404

(22) Filed: Nov. 14, 2018

(65) Prior Publication Data

US 2019/0161933 A1    May 30, 2019

(30) Foreign Application Priority Data

Nov. 30, 2017   (CN) .......................... 2017 1 1234456

(51) Int. Cl.
| | |
|---|---|
| *B09C 1/00* | (2006.01) |
| *E02D 3/02* | (2006.01) |
| *E02D 3/00* | (2006.01) |
| *A01B 79/00* | (2006.01) |

(52) U.S. Cl.
CPC ................ *E02D 3/00* (2013.01); *A01B 79/00* (2013.01); *B09C 1/00* (2013.01); *E02D 3/02* (2013.01); *B09C 2101/00* (2013.01)

(58) Field of Classification Search
CPC ......... B09C 1/00; B09C 1/08; B09C 2101/00; E02D 3/00; E02D 3/02
USPC ..... 405/128.1, 128.15, 128.45, 128.5, 128.7, 405/128.75
See application file for complete search history.

(56) References Cited

U.S. PATENT DOCUMENTS

| | | | |
|---|---|---|---|
| 5,244,311 A * | 9/1993 | Galante ..................... | B09B 1/00 404/133.05 |
| 6,350,383 B1 * | 2/2002 | Douglas .................... | B09C 1/00 210/679 |

(Continued)

FOREIGN PATENT DOCUMENTS

| | | | |
|---|---|---|---|
| CN | 206936008 | * | 1/2018 |
| CN | 109105167 | * | 1/2019 |
| JP | 2010099584 | * | 5/2010 |

*Primary Examiner* — Frederick L Lagman
(74) *Attorney, Agent, or Firm* — J.C. Patents

(57) ABSTRACT

The present disclosure provides an isolation and restoration method for compound contaminated soil. The isolation and restoration method for the compound contaminated soil provided by the present disclosure is used for isolation and restoration of a contaminated site, which includes: laying an isolation layer, a pure soil layer and an arable soil layer containing compound soil in turn on the contaminated site which is flattened and compacted, where the compound soil is composed of loess, slaked lime, fine sand and substances having an adsorption function in a volume ratio.

5 Claims, 2 Drawing Sheets

(56) References Cited

U.S. PATENT DOCUMENTS

| | | | | |
|---|---|---|---|---|
| 7,011,766 B1* | 3/2006 | Hull | .......................... | B09C 1/08 |
| | | | | 252/88.1 |
| 2008/0317553 A1* | 12/2008 | Kugler | .................... | B09B 1/004 |
| | | | | 405/129.1 |
| 2013/0170911 A1* | 7/2013 | Richards | ................. | B09B 1/004 |
| | | | | 405/128.75 |
| 2015/0352387 A1* | 12/2015 | Knippa | ..................... | B09C 1/10 |
| | | | | 435/264 |

* cited by examiner

ISOLATION AND RESTORATION METHOD FOR COMPOUND CONTAMINATED SOIL

CROSS-REFERENCES TO RELATED APPLICATIONS

The present disclosure claims priority to Chinese application number 201711234456.4, filed on Nov. 30, 2017, which is incorporated by reference in its entirety.

TECHNICAL FIELD

The present disclosure relates to the field of contaminated soil restoration and treatment, in particular to an isolation and restoration method for compound contaminated soil.

BACKGROUND

According to the *Report of the National General Survey of Soil Contamination released* in China in 2014, the overall situation of the soil environment in China is not optimistic, and the soil environment problems in industrial and mining wasteland are prominent; in terms of the contamination type, the most common type is the inorganic type, and among the inorganic pollutants, the most common pollutants are eight types of heavy metal elements such as cadmium, mercury, arsenic, copper, lead, chromium, zinc and nickel. Studies have shown that the process of soil contamination by toxic minerals not only leads to decline in soil fertility, crop yield and quality, but also easily causes groundwater pollution and accumulates in plants, animals and humans through the food chain. Therefore, restoration and treatment of compound contaminated soil caused by various heavy metals or organic and inorganic mixed pollutants has always been a hot and difficult point in research at home and abroad.

Soil barrier landfill restoration technology is a common technical means for the treatment of contaminated sites and is widely used, and the technical principle thereof is to block the migration and diffusion of pollutants in the soil by laying a barrier layer, so that the contaminated soil is isolated from the surrounding environment and achieve the purpose of treatment of the contaminated land. The in situ soil barrier covering system generally consists of a soil blocking system, a covering system, a monitoring system, etc. The soil barrier system is mainly composed of an HDPE membrane, a mud wall and other anti-penetration barrier materials, and a barrier layer is built around the contaminated area to limit the contaminated area within a specific range; for the soil covering system, the clay layer and the geomembrane usually constitute one or more isolation layers; the monitoring system mainly consists of upstream and downstream monitoring wells of the barrier area.

With respect to the soil barrier landfill technology currently used in China, the barrier treatment of contaminated sites is close to the pollution control level of China's hazardous waste landfills, and the system to be built during the restoration process is complicated. When the treatment area with heavy metal contaminated soil is larger and the amount of treatment work increases correspondingly, it directly leads to high construction cost and low cost-effectiveness for the restoration work. For example, the cost of restoration in the situ soil barrier covering technology is generally 500 to 800 RMB/m², that is, 33.3 to 533,000 RMB/mu, and the restoration cost is high. Therefore, it is necessary to find a kind of isolation and restoration technology that is relatively low in price and can effectively isolate compound contaminated soil caused by pollutants mixed by a plurality of heavy metals or organic matters and inorganic matters, so that the technology can be widely promoted.

SUMMARY

The present disclosure provides an isolation and restoration method for compound contaminated soil, so as to solve the problem that the existing soil barrier landfill restoration technology is expensive.

The present disclosure provides an isolation and restoration method for the compound contaminated soil, which is used for isolating and restoring contaminated sites, including:

flattening and compacting the contaminated site;

laying an isolation layer containing compound soil on the contaminated site;

rolling the isolation layer;

laying a pure soil layer on the isolation layer;

laying an arable soil layer on the pure soil layer;

where the compound soil is composed of loess, slaked lime, fine sand and a substance having an adsorption function in a volume ratio;

where the pure soil layer is composed of clean soil with a thickness of 10 cm to 40 cm, and with a compaction coefficient of 0.9;

where the arable soil layer is composed of clean soil with a thickness of 20 cm to 40 cm, and is used for planting crops or grass.

Further, the substance having an adsorption function is palygorskite, and the compound soil is made of a mixture of loess, slaked lime, fine sand and palygorskite in a volume ratio of 5:1.5:2:1.5.

Optionally, the substance having an adsorption function is activated carbon, and the compound soil is made of a mixture of loess, slaked lime, fine sand and activated carbon in a volume ratio of 5:2:2:1.

Further, before laying the isolation layer containing the compound soil on the contaminated site, the method further includes: laying a clay layer on the contaminated site, and the clay layer has a thickness of 10 cm to 30 cm.

Optionally, before laying the pure soil layer on the isolation layer, the method further includes: laying an anti-penetration membrane on an upper portion of the isolation layer.

Preferably, the anti-penetration membrane is an HDPE membrane having a thickness of 1.5 mm to 2 mm.

Preferably, a laying thickness of the isolation layer is 5 cm to 15 cm, and a compaction coefficient of the isolation layer is 0.95.

The present disclosure provides an isolation and restoration method for the compound contaminated soil, which is used for isolating and restoring a contaminated site containing compound contaminated soil caused by pollutants mixed by a plurality of heavy metals or organic matters and inorganic matters, the method is specifically as follows: flattening and compacting the contaminated site; laying an isolation layer containing compound soil on the contaminated site after flattening the site, and rolling and compacting the isolation layer, where the isolation layer is composed of loess, slaked lime, fine sand and a substance having an adsorption function in a volume ratio; and then the pure soil layer and the arable soil layer are successively laid on the isolation layer, and both of the pure soil layer and the arable soil layer are composed of clean soil, where the pure soil layer has a thickness of 10 cm to 40 cm, the compaction coefficient is 0.9, and the arable soil layer has a thickness of 20 cm to 40 cm for planting crops or grasses. The isolation layer laid in the present disclosure is used for blocking the migration of pollutants in the contaminated soil to the upper environment so as to prevent it from contaminating the clean soil; the pure soil layer acts as a buffer layer between the isolation layer and the arable soil layer, which can further prevent the pollutants adsorbed in the isolation layer from migrating to the upper part on one hand, and has the function of water retention and fertilizer conservation so as to ensure crop growth on the other hand. The process link of the present disclosure is simple, the construction rate is fast, and the cost is significantly lower than the traditional soil barrier landfill restoration technology.

DESCRIPTION OF EMBODIMENTS

In order to make the objects, technical solutions and advantages of the embodiments of the present disclosure more clear, the technical solutions in the embodiments of the present disclosure are clearly and completely described in the following with reference to the accompanying drawings in the embodiments of the present disclosure. It is apparent that the described embodiments are a part of the embodiments of the present disclosure, rather than all of the embodiments. All other embodiments obtained by those skilled in the art based on the embodiments of the present disclosure without making creative labor shall fall within the scope of the present disclosure.

Embodiment I

Figure 1:
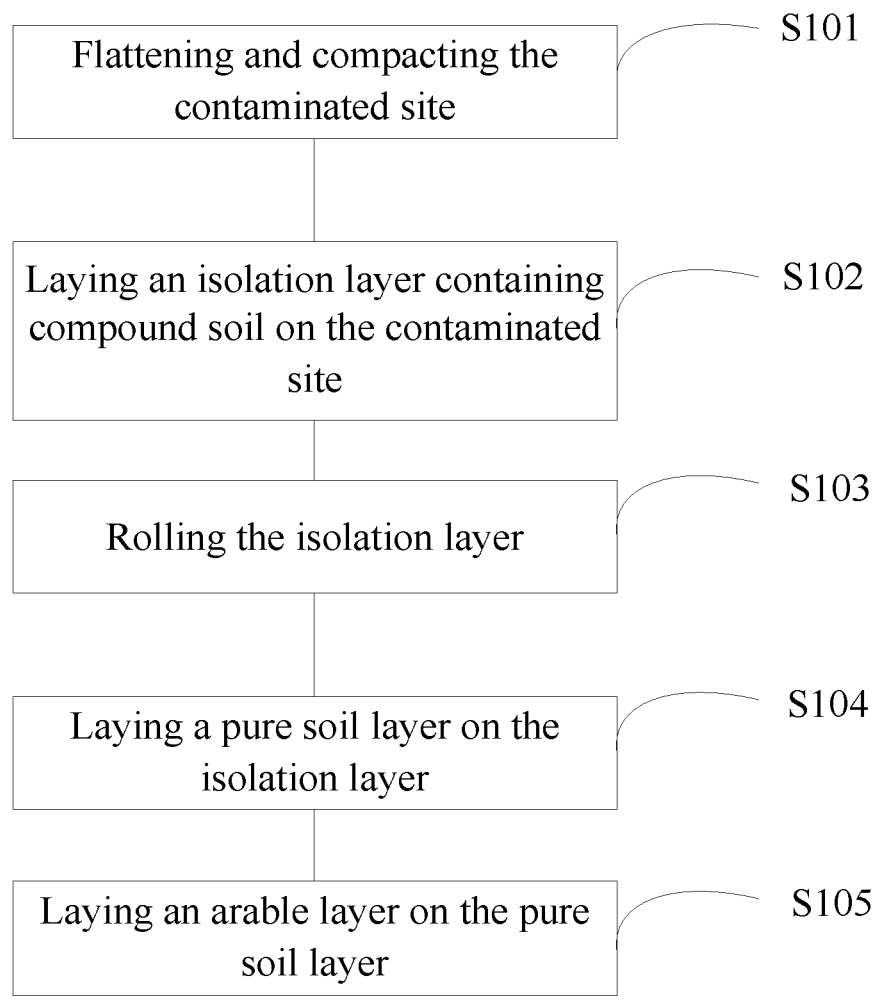
FIG. 1 is a flow chart of an isolation and restoration method for compound contaminated soil according to Embodiment I.

FIG. 1 is a flow chart of an isolation and restoration method for compound contaminated soil according to Embodiment I. As shown in FIG. 1, the present embodiment provides an isolation and restoration method for the compound contaminated soil, which is used for isolating and restoring a contaminated site, including:

S101: flattening and compacting the contaminated site.

During the development of the mining area, due to the influence of mining methods, beneficiation processes and the characteristics of the ore itself, there are often many types of heavy metal pollution elements rather than a single one in the contaminated land of the mining area, that is, the contaminated site in the mining area is compound contaminated soil containing various types of heavy metals. Organic pollutants and inorganic pollutants produced by industrial life such as industrial parks and landfills are often mixed in the contaminated site, making the contaminated site compound contaminated soil containing organic and inorganic pollutants.

Therefore, in order to treat and restore the contaminated site containing compound contaminated soil, the site needs to be cleaned and leveled at first. The contaminated site is flattened and compacted to slow down the diffusion and migration rate of pollutants in the environment.

S102: laying an isolation layer containing compound soil on the contaminated site.

After the contaminated site is flattened and compacted, an isolation layer containing the compound soil is uniformly laid on the site, where the compound soil is composed of loess, slaked lime, fine sand and substances having an adsorption function in a volume ratio.

The isolation layer is one of the key technologies to achieve the isolation of harmful pollutants in the contaminated soil. The selection and ratio of different materials in the isolation layer and the isolation mechanism and effect of various materials on different harmful substances are not the same.

Studies have found that the slaked lime in the compound soil of the present embodiment can significantly increase the pH value of the soil, thereby facilitating the stability of heavy metals, and the stability efficiency with respect to Pb, Cu and Cd in the soil can reach 99.79%, 99.78% and 98.5%. However, it is difficult to achieve simultaneous isolation and passivation of various heavy metals in the soil only by slaked lime. This is because the slaked lime has selectivity for passivation of different heavy metals. As the applied amount of lime and time increase, the content of effective-state heavy metals Pb and Cd is significantly reduced, however, regardless of the duration of treatment, a small amount of lime does not affect the content of effective-state mercury in the soil, while the application of too much lime will increase the content of effective-state mercury in the soil. For example, studies have found that adding lime to mercury-containing soils is only effective in an environment with a pH of 6-7. When the pH value rises to 7.72, the effect begins to decline. If the pH value continues to rise, it may even have a reaction.

Therefore, the compound soil in the embodiment further contains a substance having an adsorption function, to further adsorb difficult-to-solidify pollutants, especially heavy metals which cannot be effectively passivated by the slaked lime, through physical adsorption functions, so as to enhance the repair effect and solve the problem of poor restoration of the compound contaminated soil in the existing barrier restoration technology.

Preferably, the substance having the adsorption function may be palygorskite or activated carbon, or may be other clay minerals having the adsorption function, such as bentonite, zeolite, or the like. Studies have shown that the application of the slaked lime in the soil enhances the pH value of the soil as well as the adsorption of clay minerals on heavy metals.

Therefore, in this embodiment, loess, slaked lime, fine sand and palygorskite or activated carbon are combined to form the compound soil according to a certain volume ratio as the isolation layer, the chemical action of slaked lime is taken advantage of to isolate the passivated pollutants on one hand, and the physical adsorption of palygorskite or activated carbon is used to further adsorb the pollutants in the soil, especially the heavy metals which cannot be effectively passivated by the slaked lime, on the other hand. The two complement each other, and the presence of the slaked lime promotes the adsorption of palygorskite and activated carbon, thus greatly enhancing the isolation and restoration effect of the isolation layer on the compound contaminated soil.

Preferably, when the material having the adsorption function is selected to be palygorskite, the compound soil is prepared by mixing loess, slaked lime, fine sand and palygorskite in a volume ratio of 5:1.5:2:1.5, and the compound soil has the best effect on the isolation and restoration of the contaminated site. Of course, in actual use, the compound soil can also be made from loess, slaked lime, fine sand and palygorskite according to the volume ratio of 5:2:2:1 according to the contamination situation of the contaminated site.

When the material having the adsorption function is selected to be activated carbon, the compound soil is prepared by mixing loess, slaked lime, fine sand and activated carbon in a volume ratio of 5:2:2:1, and the compound soil has the best effect on the isolation and restoration of the contaminated site. In actual use, the compound soil can also be made from loess, slaked lime, fine sand and activated carbon according to the volume ratio of 5:1.5:2:1.5 according to the contamination situation of the contaminated site.

In this step, the uniform laying of the compound layer containing the compound soil on the contaminated site can effectively isolate the pollutants in the soil, and the construction process is simple, and the material constituting the compound soil is low in cost and easy to obtain.

S103: rolling the isolation layer.

After the isolation layer is laid, the isolation layer needs to be rolled, the isolation layer is compacted, and the compaction coefficient of the isolation layer is not lower than 0.95. The laying thickness of the isolation layer can be selected according to the contamination situation of the contaminated site. The laying thickness of the isolation layer is generally not less than 10 cm. The isolation layer with a certain thickness helps to isolate the pollutants in the contaminated soil, and compacting the isolation layer can effectively slow down the migration of pollutants at the bottom of the isolation layer to the upper part of the isolation layer, and improve the durability of isolation and restoration effect of the isolation layer.

S104: laying a pure soil layer on the isolation layer.

After the isolation layer is rolled and compacted, a pure soil layer with a certain thickness is laid on the upper part of the isolation layer. The pure soil layer mainly uses clean soil in uncontaminated areas and is evenly laid on the upper part of the isolation layer. On the one hand, the pure soil layer acts as a buffer layer between the isolation layer and the arable soil layer, further preventing the pollutants in the isolation layer from migrating to the upper arable soil layer and polluting the soil; on the other hand, the pure soil layer can also be used as a core layer for soil reconstruction which has the function of water retention and fertilizer conservation. The thickness of the pure soil layer is selected according to the contamination situation of the site, but it should not be lower than 20 cm, and the general selection range is 20 cm to 40 cm.

If the restoration site is used as the reclamation land, the thickness of the pure soil layer should be 30 cm to 40 cm, so that the pure soil layer can play sufficient water retention and fertilizer conservation functions to ensure the growth of the crop. At the same time, the pure soil layer also needs to be rolled, and the compaction coefficient should not be lower than 0.8 in general.

S105: laying an arable layer on the pure soil layer.

After the completion of the pure soil layer, the arable soil layer is laid on the pure soil layer, and the arable soil layer is used as the most superficial soil after the restoration of the contaminated soil, and can be used for planting crops, grass and trees to restore the landscape environment. The soil in the arable soil should be selected from uncontaminated clean soil, and the thickness of the arable soil layer can be selected from 20 cm to 40 cm according to the planting crop in general. When the arable soil layer is used for planting grass, the thickness can be selected from 20 cm to 25 cm. When the arable soil layer is used for planting crops, the thickness should generally be not lower than 30 cm. In order to ensure the greening of the site after restoration, the soil in the arable soil layer should not contain plant roots, the amount of tuberculosis in the soil should be no more than 2%, and the content of water-soluble salt should be less than 3%.

Preferably, the soil in the arable soil layer should be selected to be the matured soil after ripening. If the arable soil layer is raw soil, it is necessary to mature and nourish the arable soil.

In the isolation and restoration method for the compound contaminated soil provided by the embodiment, the contaminated site is firstly flattened and rolled, and then the isolation layer, the pure soil layer and the arable soil layer containing the compound soil are laid on the flattened site in turn to realize isolation and restoration for the compound contaminated soil. Where the compound soil in the isolation layer is composed of loess, slaked lime, fine sand and substances having the adsorption function in a volume ratio. The isolation layer utilizes the chemical action of the slaked lime to isolate the passivated pollutants on the one hand, and utilizes the physical adsorption of the substance having the adsorption function to further adsorb the pollutants in the soil, especially the heavy metals which cannot be effectively passivated by the slaked lime on the other hand, and the two complement each other, greatly enhancing the isolation and restoration effect of the isolation layer on the compound contaminated soil. The isolation and restoration method for the compound contaminated soil provided by the embodiment has fewer construction steps, the process flow is simple, the material of the isolation layer is easy to purchase and the price is low, and the construction process has no secondary contamination, rendering the cost application of the method relatively lower, and multiple pollutants in the compound contaminated soil are effectively isolated, which has the advantages of safety and economy.

Embodiment II

Figure 2:
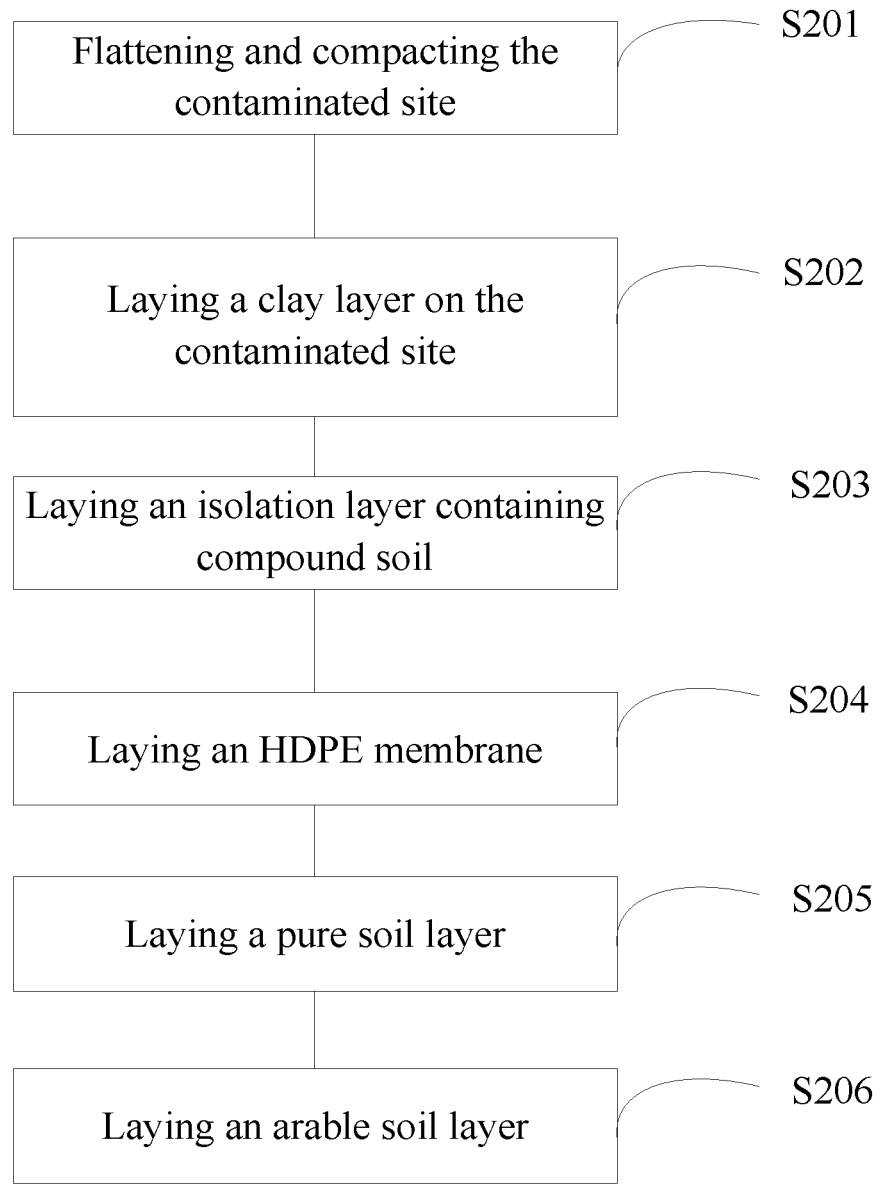
FIG. 2 is a flow chart of an isolation and restoration method for compound contaminated soil according to Embodiment II.

FIG. 2 is a flow chart of an isolation and restoration method for the compound contaminated soil according to Embodiment II. On the basis of Embodiment I, in order to improve the durability of the isolation and restoration effect and ensure the long-term reclamation condition after the compound contaminated soil is isolated and restored. Embodiment II provides another isolation and restoration method for the compound contaminated soil.

The isolation and restoration method for the compound contaminated soil according to Embodiment II is used for reclamation of a contaminated site, including:

S201: flattening and compacting the contaminated site.

During the development of the mining area, due to the influence of mining methods, beneficiation processes and the characteristics of the ore itself, there are often many types of heavy metal pollution elements rather than a single one in the contaminated land of the mining area, that is, the contaminated site in the mining area is compound contaminated soil containing various types of heavy metals. Contamination produced by industrial life such as industrial parks and landfills is often compound contaminated soil with coexisting organic pollutants and inorganic pollutants.

Therefore, in order to treat and restore the contaminated site containing compound contaminated soil, the site needs to be cleaned and leveled at first. The contaminated site is flattened and compacted to slow down the diffusion and migration rate of pollutants in the environment.

S202: laying a clay layer on the contaminated site.

After flattening and compacting the contaminated site, a clay layer is laid on the contaminated site. In order to slow down the migration of pollutants to the upper part of the contaminated soil, a clay layer is evenly laid on the contaminated site.

The clay itself is larger than the surface area, particles are negatively charged and thus have good physical adsorption and surface chemical activity, and also have the ability to exchange with other cations. At the same time, wet clay has a small permeability coefficient and a good anti-penetration function. Therefore, by laying a clay layer with a certain thickness on the upper part of the contaminated site as a flexible barrier, it can not only adsorb and exchange pollutants in the contaminated soil, especially heavy metals, but also significantly slow down the migration of pollutants in the contaminated soil to the upper part, thereby increasing the durability of isolation and restoration effects.

Preferably, a laying thickness of the clay layer is 10 cm to 30 cm, and can be adjusted according to the contamination degree of the contaminated site during use. For example, for a light contaminated degree and slow diffusion and migration rate, the clay layer can be laid to a thickness of 10 cm to 15 cm; if the pollutants in the soil in the contaminated site exceed the standard seriously, and the content of harmful pollutants is 100 times higher than the local environmental background value, then the clay layer can be laid to an adjusted thickness of 20 cm to 30 cm to effectively reduce the migration rate of pollutants.

Further, the clay layer has a permeability coefficient K of $1 \times 10^{-7}$ cm/s to $1 \times 10^{-6}$ cm/s, thereby ensuring a good anti-penetration function of the clay layer.

S203: laying an isolation layer containing compound soil on the clay layer.

After the clay layer is laid, an isolation layer containing the compound soil is uniformly laid on the upper part of the clay layer. The isolation layer in Embodiment I is adopted here as the isolation layer containing the compound soil adopts, and the composition ratio of the compound soil is consistent with that of the compound soil used in Embodiment I.

Further, since the clay layer is laid on the lower part of the isolation layer, the clay layer can effectively adsorb the pollutants in the contaminated site and slow down the migration of the pollutants in the contaminated site to the isolation layer. Therefore, the laying thickness of the isolation layer can be correspondingly reduced. The laying thickness of the isolation layer is generally 5 cm to 15 cm, and the compaction coefficient is 0.95 to reduce construction costs. When the contamination degree of the contaminated site is light, the laying thickness of the isolation layer is 5 cm to 10 cm, and when the contamination degree is serious, 10 cm to 15 cm is selected.

S204: laying an anti-penetration membrane on the isolation layer.

Since the composition of the compound soil contains palygorskite or activated carbon that has strong adsorption, when the palygorskite or activated carbon adsorbs too much water, its adsorption on pollutants, especially on heavy metals, will decrease. Therefore, in order to reduce the adsorption of water on the upper pure soil layer by the palygorskite or activated carbon, the anti-penetration membrane is also laid on the upper part of the isolation layer.

Preferably, an HDPE membrane is selected as the anti-penetration membrane. On the one hand, the HDPE membrane has excellent waterproof performance, and can avoid the reduction of the adsorption effect of the parasitic stone or the activated carbon in the isolation layer on the pollutants due to the adsorption of the moisture in the pure soil layer; on the other hand, the HDPE membrane also has excellent puncture resistance and can resist most plant roots, thereby preventing the roots of the crops in the upper soil layer from penetrating into the isolation layer, which causes damages to the plant growth by the compound soil in the isolation layer. At the same time, laying the HDPE membrane can also avoid the leakage of water and nutrients in the pure soil layer to the lower isolation layer, which makes the pure soil layer lose the function of water retention and fertilizer conservation.

Further, in order to optimize the anti-penetration and puncture resistance of the HDPE membrane, the laying thickness of the HDPE membrane is set to 1.5 mm to 2 mm.

S205: laying a pure soil layer on the anti-penetration membrane.

After the anti-penetration membrane is laid, the pure soil layer is laid on the upper part of the anti-penetration membrane, and the pure soil layer is laid in the same manner as in Embodiment I. The specific parameters and laying thickness of the clean soil in the pure soil layer are also the same as those in Embodiment I, which will not be described in detail herein.

S206: laying an arable soil layer on the pure soil layer.

After the pure soil layer is laid, the arable soil layer is laid on the pure soil layer. In the present embodiment, the arable soil layer is used for cultivating crops and used as reclamation farmland. Therefore, the thickness of the arable soil layer should be thicker and should not be lower than 30 cm. The soil in the arable soil layer should be uncontaminated clean soil. The soil in the arable soil layer should not contain plant roots. The amount of tuberculosis in the soil should be no more than 2%, and the content of water soluble salt should be less than 3%.

Preferably, the soil in the arable soil layer should be selected to be the matured soil after ripening. If the arable soil is raw soil, it is necessary to mature and nourish the cultivated soil. Soil maturation can be accelerated by growing legumes in the arable soil while using nitrogen, phosphate and organic fertilizers.

It should be noted that, in Embodiment II, above steps S202 and S204 are not required, and only steps S201, S202, S203 and S205 may be performed, or only steps S201, S203, S204 and S205 may be performed; or steps S201, S202, S203, S204 and S205 may be sequentially performed.

Optionally, before step S203, a second anti-penetration membrane is further laid, and then step S203 is performed, that is, the isolation layer is laid on the second anti-penetration membrane. By laying the second anti-penetration membrane on the bottom of the isolation layer, the migration rate of the pollutants in the contaminated site to the upper isolation layer can be effectively slowed down, thereby improving the durability and safety of the isolation and restoration technology.

Preferably, the HDPE membrane is selected as the second anti-penetration membrane, and the laying thickness thereof is set to 1.5 mm to 2 mm.

In the isolation and restoration method for the compound contaminated soil provided by the present embodiment, by laying the clay layer, the isolation layer, the anti-penetration membrane, the pure soil layer and the arable soil layer on the contaminated site in turn, and utilizing the adsorption and exchange functions of the clay layer to adsorb various pollutants in the contaminated site, thus achieving first isolation and adsorption of pollutants, and slowing down the migration rate of pollutants to the isolation layer; then by utilizing the compound soil in the isolation layer to conduct secondary isolation and adsorption on the pollutants, thereby preventing pollutants from migrating to the upper part and improving the durability and safety of the isolation and restoration effect. At the same time, the anti-penetration membrane is laid on the upper part of the isolation layer, thus reducing the absorption of moisture in the upper soil layer by the compound soil, improving the isolation and adsorption effect of the isolation layer on the pollutants, and ensuring the safety of reclamation after the isolation and restoration of the contaminated site.

Finally, it should be noted that the above embodiments are merely illustrative of the technical solutions of the present disclosure, and are not intended to be limiting; although the present disclosure has been described in detail with reference to the foregoing embodiments, those skilled in the art will understand that the technical solutions described in the foregoing embodiments may be modified, or some or all of the technical features may be equivalently replaced; and the modifications or substitutions do not deviate the essence of the corresponding technical solutions from the scope of technical solutions of the embodiments of the present disclosure.

What is claimed is:

1. An isolation and restoration method for compound contaminated soil, which is used for isolating and restoring a contaminated site, comprising:
    flattening and compacting the contaminated site;
    laying an isolation layer containing compound soil on the contaminated site;
    rolling the isolation layer;
    laying a pure soil layer on the isolation layer;
    laying an arable soil layer on the pure soil layer;
    wherein the compound soil is composed of loess, slaked lime, fine sand and a substance having an adsorption function in a volume ratio;
    wherein the pure soil layer is composed of clean soil with a thickness of 10 cm to 40 cm, and with a compaction coefficient of 0.9;
    wherein the arable soil layer is composed of clean soil with a thickness of 20 cm to 40 cm, and is used for planting crops or grass; and
    wherein the substance having an adsorption function is palygorskite, and the compound soil is made of a mixture of loess, slaked lime, fine sand and palygorskite in a volume ratio of 5:1.5:2:1.5.

2. The isolation and restoration method for the compound contaminated soil according to claim 1, wherein before laying the isolation layer containing the compound soil on the contaminated site, the method further comprises:
    laying a clay layer on the contaminated site, wherein the clay layer has a thickness of 10 cm to 30 cm.

3. The isolation and restoration method for the compound contaminated soil according to claim 1, wherein before laying the pure soil layer on the isolation layer, the method further comprises:
    laying an anti-penetration membrane on an upper portion of the isolation layer.

4. The isolation and restoration method for the compound contaminated soil according to claim 3, wherein the anti-penetration membrane is an High Density Polyethylene Impermeable (HDPE) membrane having a thickness of 1.5 mm to 2 mm.

5. The isolation and restoration method for the compound contaminated soil according to claim 1, wherein a laying thickness of the isolation layer is 5 cm to 15 cm, and a compaction coefficient of the isolation layer is 0.95.

* * * * *